March 15, 1960 R. R. JOHNSON ET AL 2,928,409
NON-MAGNETIC ELECTRO HYDRAULIC TRANSFER VALVE
Filed Jan. 31, 1955 6 Sheets-Sheet 4

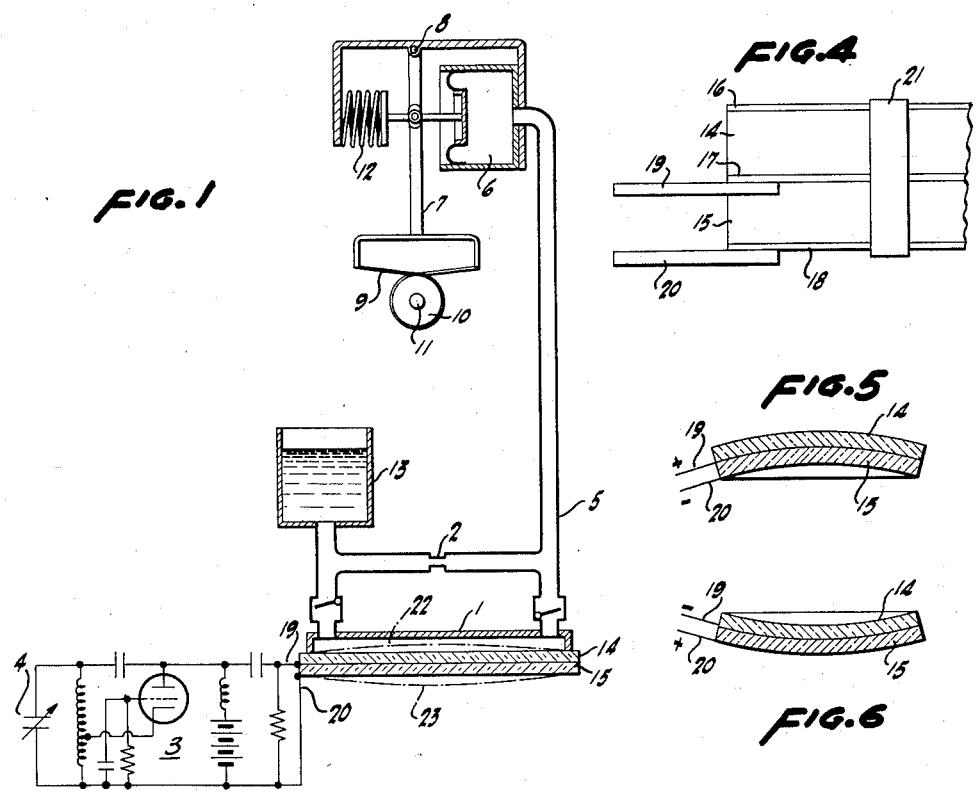

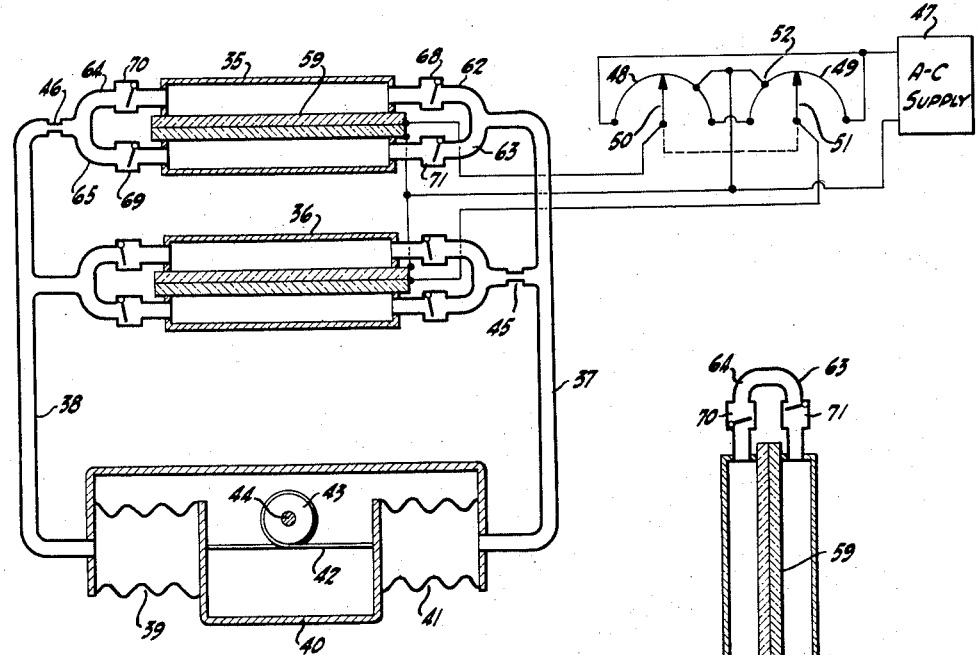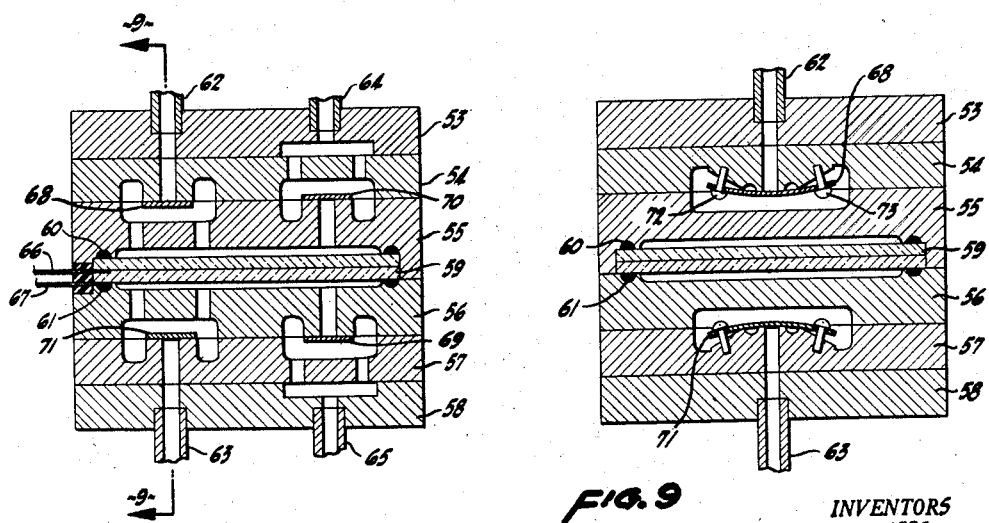

INVENTORS
GLENN A. WALTERS
ROBERT R. JOHNSON
ROBERT J. STAHL
BY Lippincott and Smith
ATTORNEYS

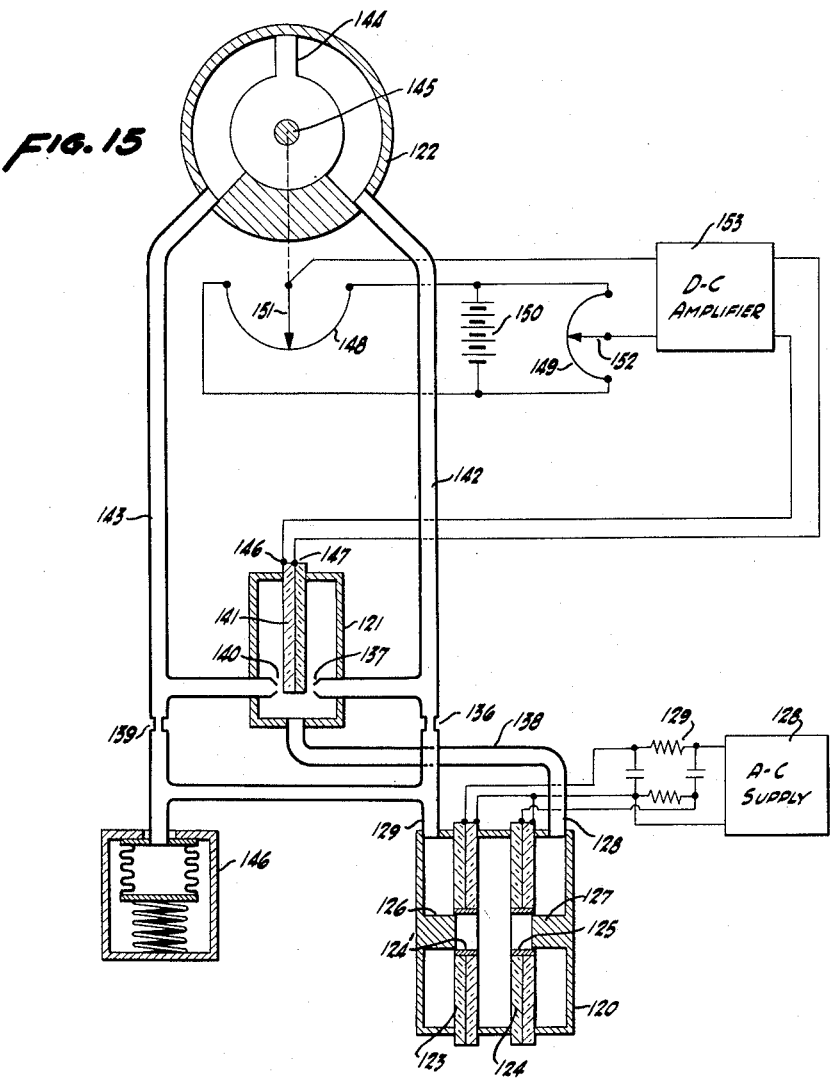

INVENTORS
GLENN A. WALTERS
ROBERT R. JOHNSON
ROBERT J. STAHL

BY Lippincott and Smith

ATTORNEYS

# United States Patent Office 2,928,409
Patented Mar. 15, 1960

2,928,409

NON-MAGNETIC ELECTRO HYDRAULIC TRANSFER VALVE

Robert R. Johnson, San Carlos, Robert J. Stahl, Redwood City, and Glenn A. Walters, Atherton, Calif., assignors, by mesne assignments, to Textron Inc., Providence, R.I., a corporation of Rhode Island Application January 31, 1955, Serial No. 485,010

5 Claims. (Cl. 137—82)

This invention relates to hydraulic control systems, and in particular to electrically powered and controlled hydraulic means using piezoelectric elements as voltage to hydraulic pressure transducers.

A need exists for an electrically operated control system which does not produce magnetic fields. For example, in airborne magnetic detection equipment used in geophysical explorations and in locating underwater ferromagnetic objects, such as submarines, the magnetic detector element is very sensitive with respect to its orientation relative to the earth's magnetic field. Mechanism is needed to continually adjust this orientation, preferably responsive to electrical control signals which can be provided by means previously known, but this adjusting means must not in itself produce any appreciable magnetic field which would affect the magnetic detection equipment. The detector element may be mounted in gimbals, and its orientation can be adjusted by actuator means rotating shafts or performing other mechanical movements. Accordingly, an object of this invention is to provide control equipment which can adjust the angular position of a shaft or perform other desired mechanical movements, which is responsive to electrical control signals and which does not produce any appreciable magnetic field. Another object is to provide an improved control system having a fast response speed so that the orientation of the magnetic detector element can be adjusted quickly and continuously to compensate for changes in attitude of the airborne device carrying the equipment, however quickly and violently such changes in attitude may occur. Another object is to provide such control systems which are simple, lightweight and rugged, and are suitable for airborne applications.

Other objects of the invention are to provide a displacement type pump which contains a minimum number of moving parts, in which a pump diaphragm is vibrated by electrical means without the use of a motor or any other moving part except the diaphragm, and in which all moving parts of the pump are completely enclosed and sealed within the pump housing. Another object is to provide a diaphragm pump in which the need for conventional check valves is eliminated, thereby avoiding valving problems. Another object is to provide a displacement type fluid pump capable of operating at much higher cyclic rates than has been feasible heretofore. Another object is to provide an improved electrically-operated transfer valve for controlling fluid pressures. Other objects and advantages will appear as the description proceeds.

Briefly stated, in accordance with one aspect of this invention, a displacement-type diaphragm pump is provided in which the pump diaphragm is a piezoelectric bender assembly, preferably made from two discs of piezoelectric ceramic material such as barium titanate. Metallic electrodes are provided on the faces of the piezoelectric discs in a conventional manner, and the discs are cemented together so that a center portion of the disc bends or bows out in response to a voltage applied to the electrodes. An alternating voltage applied to the electrodes causes the center of the diaphragm to oscillate or bow outward in opposite directions alternately. When such a piezoelectric diaphragm is incorporated in a displacement-type pump, the piezoelectrically produced oscillations provide the cyclic volume variations or displacements necessary for pumping action.

The term "piezoelectric" has been used in this specification and appended claims for convenience; however, it is understood that other means for transducing electric fields into mechanical strain, such as electrostrictive devices, may be employed.

In accordance with another aspect of this invention a hydraulic control system is provided in which the adjustable flow rate of a hydraulic pump determines the pressure drop across a hydraulic circuit resistance, generally provided by a constricted fluid passageway, and thus establishes an adjustable hydraulic pressure difference used for control purposes. In a preferred form of this hydraulic system, two pumps are operative to provide opposing pressure differences, so that the net pressure difference used for control purposes depends upon a difference in the pumping forces of the two pumps.

In accordance with another aspect of this invention, a hydraulic pressure difference is controlled by a piezoelectric vane incorporated in a control or transfer valve of the supply and waste type.

In accordance with still another aspect of this invention the use of conventional check valves in a diaphragm pump is made unnecessary by a novel valving arrangement whereby oscillations of a pump diaphragm provide cyclic changes in a hydraulic circuit resistance. When two such diaphragms forming part of the same pumping chamber are oscillated out-of-phase, preferably in phase quadrature, the changing hydraulic circuit resistances can be made to have a rectifying action which provides a unidirectional net flow and thus makes possible the elimination of check valves.

The invention will be better understood from the following description taken in connection with the accompanying drawings, and its scope will be pointed out in the appended claims.

In the drawings:

Fig. 1 is a schematic diagram of a control system embodying certain principles of this invention;

Fig. 2 is a vertical section of a novel pump forming part of the control system shown in Fig. 1;

Fig. 3 is a section taken generally along the line 3—3 of Fig. 2;

Fig. 4 is a construction detail for the piezoelectric diaphragm of the pump shown in Figs. 2 and 3;

Fig. 5 is a schematic section of a piezoelectric diaphragm showing in an exaggerated manner how the diaphragm bends responsive to an applied voltage;

Fig. 6 is a section generally similar to Fig. 5, showing the bending of the diaphragm when the polarity of the applied voltage is reversed;

Fig. 7 is a schematic diagram illustrating another control system embodying certain principles of this invention;

Fig. 8 is a section of a novel pump forming a part of the control system shown in Fig. 7;

Fig. 9 is a section taken generally along the line 9—9 of Fig. 8;

Fig. 10 is a schematic diagram illustrating alternative fluid connections for a pump shown in Figs. 8 and 9;

Fig. 15 is a schematic diagram showing another control system embodying certain principles of this invention;

Figure 11:
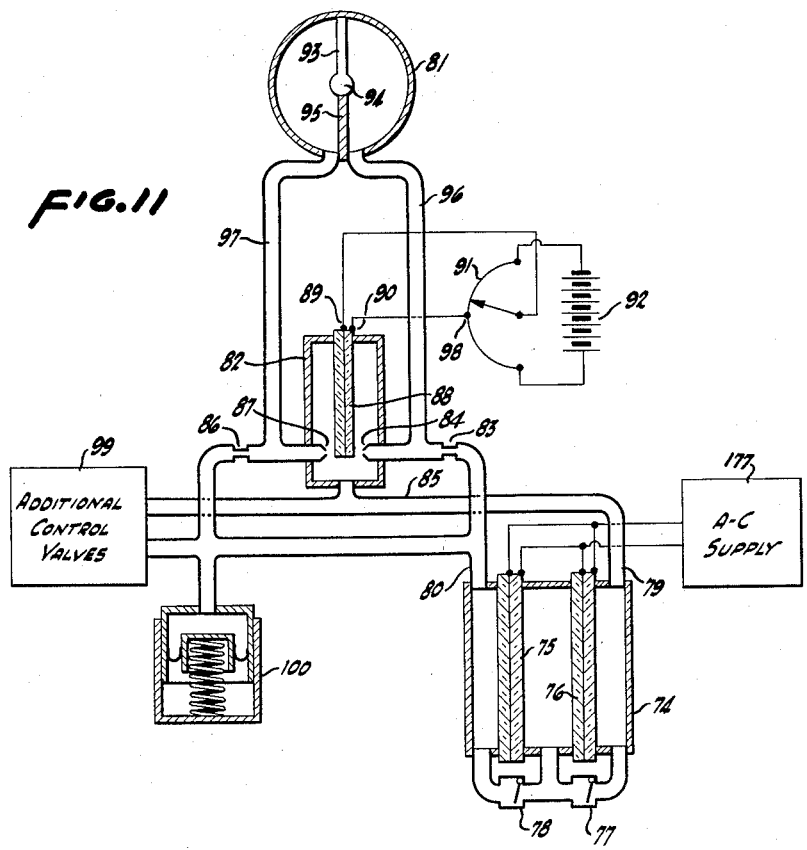
Fig. 11 is a schematic diagram showing another control system embodying certain principles of this invention.

Referring now to the drawing, Fig. 1 shows a control system in which a variable output pump 1 circulates a liquid through a hydraulic circuit including a constricted passageway 2 which offers resistance to flow of the liquid. Pump 1 and passageway 2 are in parallel arms of the hydraulic circuit, as shown, and the constricted arm forms a fluid return circuit between the outlet and the inlet of the pump. As is explained more fully hereinafter, pump 1 is operated by an alternating voltage supplied by a suitable A.C. source such as a conventional Hartley vacuum tube oscillator 3. The output of pump 1 can be adjusted by changing the frequency of its operating voltage, for example, by adjusting variable capacitor 4 to change the operating frequency of oscillator 3. In general, when the frequency is increased pump 1 operates at a faster rate and circulates more liquid through the hydraulic circuit. The increased flow of liquid produces a larger pressure drop across restriction 2, with a corresponding larger pressure rise across pump 1, and increases the hydraulic pressure in pipe 5. Responsive to the increased fluid pressure a hydraulic motor or actuator bellows 6 expands and moves a forked lever 7 to the left about its pivot 8. Stretched taut across the forked end of lever 7, there is a flexible band or wire 9 which encircles a drum 10 attached to a rotative shaft 11. As lever 7 moves to the left, drum 10 and shaft 11 are rotated counterclockwise. Conversely, when capacitor 4 is adjusted to decrease the operating frequency of oscillator 3, pump 1 operates more slowly and circulates less fluid through the hydraulic circuit. In consequence, the pressure in pipe 5 decreases, bellows 6 contracts in response to a bias force provided by a spring 12 and shaft 11 is rotated clockwise. Thus the control system shown provides means for changing the angular position of shaft 11 responsive to adjustments of a variable capacitor 4; and with various modifications which will be readily apparent to those skilled in the art, similar control systems can perform a variety of mechanical movements or other operations responsive to frequency changes in an electric control signal. Reservoir 13 provides a supply of extra liquid to take care of changes in the liquid capacity of the system due to movements of the parts, and also allows for expansion and contraction of the fluid due to temperature changes, ambient pressure changes and the like. Although useful in some applications, this simple control system has a low response speed because the rate at which bellows 6 collapses upon a reduction of the electric signal frequency is limited by the relatively slow leakage of fluid through constricted passageway 2. A control system which overcomes this difficulty is illustrated in Fig. 7 and described hereinafter.

For a better understanding of pump 1, reference is now made to Figs. 2 through 6. Pump 1 is a diaphragm-type displacement pump in which the diaphragm is a bender piezoelectric assembly. The diaphragm includes two piezoelectric plates 14 and 15, which preferably are discs of a piezoelectric ceramic material such as barium titanate. Discs 14 and 15 are firmly cemented, bonded or otherwise fixed together, in a double-decker sandwich-like layered structure with three electrodes 16, 17 and 18 so that each face of the piezoelectric discs is immediately adjacent to one of the electrodes as is best shown in Fig. 4. The electrodes may be metal foil sheets cemented to the crystals, but preferably are metallic films or coatings applying directly to the crystal faces. If desired, a thin coating of protective material may be placed over the two outer electrodes 16 and 18. For making electrical connections to the electrodes, a small terminal strip 19 is connected to center electrode 17, and another terminal 20 is connected to one of the outer electrodes 18. The two outer electrodes 16 and 18 are connected together by a jumper 21, which may be a strip of metal foil extending around an edge of the crystal assembly, or may be any other good electrical connection including portions of the metal pump housing.

When an electric voltage is applied between two opposite faces of a piezoelectric ceramic disc such as barium titanate, the disc changes shape either by increasing in thickness and decreasing in diameter or by decreasing in thickness and increasing in diameter, depending upon the polarity of the applied voltage. In the piezoelectric pump diaphragm, discs 14 and 15 are so arranged that a voltage applied between terminals 19 and 20 causes the diameter of one disc to expand and the diameter of the other disc to contract simultaneously. Since the discs are bonded together these opposite changes in their respective diameters cause the diaphragm assembly to bend or bow out at its center, either upward, as shown in Fig. 5 and indicated by broken lines 22 of Fig. 1, or downward as shown in Fig. 6 and indicated by broken lines 23 of Fig. 1, depending upon the polarity of the applied voltage. When alternating voltage is applied between terminals 19 and 20, the diaphragm bends upward and downward alternately, so that a center portion of the diaphragm oscillates up and down, thereby alternately increasing and decreasing the volume between the diaphragm and the pump housing to provide a pumping action in the usual manner of diaphragm-type displacement pumps. Although displacements of the diaphragm are small—for example, with a piezoelectric diaphragm one inch in diameter and an electric potential of several hundred volts, the displacement at the center of the diaphragm may be in the order of 3 mils—the small amount of liquid pumped per stroke is compensated by the relatively high cyclic rate at which the piezoelectric diaphragm pump can be operated—400 cycles per second, for example—so that a small pump, about one inch in diameter, provides more than adequate pumping capacity to operate a small instrument type hydraulic control system.

The high cyclic rate and small flow per cycle in the piezoelectric diaphragm pump impose severe requirements on the pump's check valves, which must operate with unusual rapidity. One type of valve which may be used is shown in Figs. 2 and 3. The inlet valve comprises a thin metal reed 24 which is biased by its own resilience into snug engagement with the inlet port 25. When the pump diaphragm moves downward, the reduced pressure on the back or lower side of reed 24 causes the reed to bend downward and permit liquid to flow inward through the inlet port. When the crystal diaphragm moves upward, the increased pressure on the lower side of reed 24 forces it snugly against the inlet port and prevents a backward flow of liquid. A similar reed 26 allows liquid to flow out through the exhaust port, but prevents liquid from flowing back into the pump from the exhaust port. These valves are capable of operating at a high cyclic rate, because the reeds are small and light, and the reeds can be prestressed to provide relatively high spring tension and a correspondingly high natural frequency of vibration. To prestress the reeds, they are formed of metal strips which tend to assume a curved shape, such that reed 24 would bow upward if it were not in contact with the inlet port, and reed 26 would bow downward if it were not in contact with the outlet port. To prevent reed 26 from blocking the outlet connection 27 when it opens fully, connection 27 may be made at a point off center to the valve chamber as is shown in Fig. 3. If desired, a second outlet opening 27' can be provided on the other side of reed 26, as shown in Fig. 3, and the two outlet openings 27 and 27' can be connected together by any suitable fluid passageway or connection means. For ease of assembly and to permit repair of the valve, the pump housing preferably is made of two substantially disc-shaped sections 28 and 29, held together by suitable means such as screws 30. To prevent the escape of fluid through the joint between sections 28 and 29, an O-ring 31 fitting into a circular groove 32, or any other appropriate gasketing means may be employed.

The diaphragm assembly is held in fixed relation to the pump housing by an O-ring 33 which fits a circular groove in the housing and presses against one face of the diaphragm near its periphery. The diaphragm is held tightly against O-ring 33 by a retaining ring 34. Mounting of the diaphragm in this simple manner is facilitated by the fact that the assembly bends by the outward bowing of its center portions without appreciable bending of its periphery from the original circular coplanar shape. This desirable characteristic is obtained by making each piezoelectric plate circular or disc-shaped, and by using a ceramic piezoelectric material such as barium titanate which expands or contracts equally in all diametrical directions. Brush Electronics Company's Ceramic "A," which is essentially barium titanate can be used with good results. Pump diaphragms can be made with piezoelectric plates having non-circular shapes, or with plates of natural piezo-electric crystals such as Rochelle Salt which do not expand equally in all diametrical directions, but such assemblies generally require more elaborate mounting means since the peripheral portions do not in general remain coplanar when the diaphragm bends.

The output of the pump can be changed, within limits of the pump's capabilities, by changing either the frequency or the amplitude of the supply voltage. If the frequency is increased, more liquid is pumped because the pump operates at a higher cyclic rate. If the amplitude is increased, more liquid is pumped, or a higher output pressure is attained, because the diaphragm oscillations tend to become larger in amplitude, or to exert more pumping force on the liquid, and in general a larger amount of liquid is pumped during each cycle.

Fig. 7 shows a control system which is relatively fast-acting and powerful, and which has other advantages. Two pumps 35 and 36 are connected in parallel hydraulic circuit arms between output pipes 37 and 38, so that pump 35 tends to force liquid from pipe 37 into pipe 38 while pump 36 tends to force liquids from pipe 38 into pipe 37. When the pumping forces of pumps 35 and 36 are equal, there is no hydraulic pressure difference between the two pipes 37 and 38, and liquid merely circulates around the circuit loop in which the two pumps are connected in series aiding relation. However, when the pumping force of one pump is increased relative to that of the other pump, a pressure difference is established between pipes 37 and 38, the direction of which depends upon which pump has the greater pumping force. Consequently, by controlling the relative forces of pumps 35 and 36, the relative fluid pressures in pipes 37 and 38 can be controlled accurately and varied rapidly. Since positive pumping action is available to change the pressure relations in either direction, the response speed can be made quite high.

Assume that pump 35 is operating while pump 36 is not. This operation increases the pressure in pipe 38 over that in pipe 37, and causes bellows 39 to expand. As bellows 39 expands, yoke 40 moves toward the right and compresses bellows 41. A flexible tape or wire 42 is stretched taut across yoke 40, as shown, and encircles a drum 43 attached to a rotative shaft 44. Consequently, as yoke 40 moves toward the right, shaft 44 rotates counterclockwise. If shaft 44 is loaded, or if rapid motion is desired, a considerable pressure difference between pipes 37 and 38 may be desirable. However, as soon as the pressure in pipe 38 exceeds that in pipe 37 by a sufficient amount to open the check valves of pump 36, fluid tends to flow through pump 36 and prevent the build-up of larger pressure differences. To overcome this tendency, a fluid passage 45 having a constriction which impedes the flow of fluid is placed in series with pump 36 as shown, and by this means sufficient circuit resistance to the flow of fluids through pipe 36 can be provided to permit adequately large pressure differences between pipes 37 and 38. A passageway 46 having a constriction is placed in series with pump 35 to prevent an unduly large flow of liquid through pump 35 when pump 36 is trying to build up pressure in pipe 37. Although constrictions 46 and 45 decrease the available output pressures of pumps 35 and 36, this disadvantage can be overcome by designing the pumps with sufficient power to overcome the load imposed by the restrictions in their output connections.

For best results the two pumps 35 and 36 are operated synchronously, and their relative outputs are controlled by adjusting the relative amplitudes of their supply voltages. For example, both pumps may be operated from the same A.C. supply 47, to which two rheostats or potentiometers 48 and 49 are connected as parallel voltage dividers in the manner shown. For reasons which will be explained, one end of each voltage divider is an off-center tap on the rheostat, so that a portion of each rheostat is effectively disconnected from the circuit, or alternatively is shorted out. Adjustable taps 50 and 51 are ganged together, so that as tap 50 moves in the increasing voltage direction, tap 51 moves in the decreasing voltage direction, and vice versa. Pump 35 receives its operating voltage from tap 50, and pump 36 receives its operating voltage from tap 51. It will be understood that amplifiers may be inserted between the rheostats and the pumps if desired, and that other equivalent means of controlling the relative voltage amplitudes may be employed.

Assume that taps 50 and 51 are set at their midpositions, as shown in the drawing. Small alternating voltages of equal amplitude are supplied to pumps 35 and 36, so that the two pumps operate with equal force and there is no pressure difference or net transfer of fluid between pipes 37 and 38. In other words, the pressure rise across each pump just balances the pressure drop across each constricted passageway. If the two taps 50 and 51 are now turned counterclockwise, the voltage to pump 35 is increased in amplitude while that of pump 36 is decreased in amplitude, so that pump 35 applies more force to the liquid than does pump 36. Until the actuator bellows 39 and 41 begin to move, the two pumps must handle equal flow rates, since they are connected in a series hydraulic circuit loop, and since the flow rates in the two circuit arms remain equal the pressure drops across the two constricted passageways remain equal. However, the larger voltages supplied to pump 35 cause the piezoelectric diaphragm at this pump to exert more force on the liquid than the diaphragm at pump 36 exerts, and consequently a larger pressure rise occurs across pump 35 than occurs across pump 36. As a result, there is a pressure difference between pipes 37 and 38 which tends to move the hydraulic motor or actuator bellows 39 and 41. As the bellows move, pump 35 supplies the necessary transfer of fluid between pipes 37 and 38. When tap 51 reaches the off-center tap 52, the voltage supplied to pump 36 becomes zero and this pump no longer operates. Now the pressure rise across pump 35 substantially balances the pressure drops across the two constricted passageways plus other pressure losses in the circuit. As taps 50 and 51 are turned further in the counterclockwise direction, pump 36 remains out of operation, while increasingly large voltages are supplied to pump 35 so that its pumping force continues to increase, which also increases the circulating liquid flow rate and increases the pressure drops across the constricted passageways. This arrangement gives an exceptionally good operating characteristic, since near the balance point the two pumps work in opposition for quick response and accurate control, but when a substantial pressure difference or transfer of fluid from one pipe to the other is required, one pump is shut off so that the other pump is not required to supply an unnecessarily large volume of fluid. When taps 50 and 51 are turned in the clockwise direction, a similar sequence of events takes place with pump 36 operating to establish a pressure difference or to transfer fluid from pipe 38 to pipe 37.

The pumps shown in Fig. 7 could be single-action pumps of the type described in connection with Figs. 2 through 6 inclusive, in which case they should be connected to operate in opposite phase so that pump 36 is receiving fluid during the half-cycle when pump 35 discharges fluid, and vice versa. Preferably, pumps 35 and 36 are of a double action type which will now be described.

Referring now to Figs. 8 and 9, which illustrate a preferred construction of pump 35. Pump 36 may be identical. The pump housing consists of six substantially disc-shaped members 53, 54, 55, 56, 57 and 58, stacked end-to-end as shown. A piezoelectric diaphragm 59, of the type hereinbefore described in connection with Figs. 2 through 6, is positioned within a cavity between housing members 55 and 56, and the diaphragm is held in place by a pair of O-rings 60 and 61, as shown. Fluid inlet connections are provided in member 53 and 58 at 62 and 63, and fluid outlet connections are provided at 64 and 65. When alternating voltage is supplied to the electrical terminals 66 and 67, piezoelectric diaphragm 59 bends upward and downward alternately. When diaphragm 59 bends downward, liquid is drawn in through opening 62 and inlet valve 68 to the space above the diaphragm. At the same time, liquid is forced out of the space below diaphragm 59 through outlet valve 69 and outlet opening 65. When diaphragm 59 bends upward, liquid is forced out through outlet valve 70 and outlet opening 64, while liquid is drawn in through inlet connection 63 and inlet valve 71. Consequently, liquid is both received and expelled during each half-cycle, so that the pump capacity is doubled and pulsations in the flow rate are reduced.

A preferred construction of the check valves is best shown in Fig. 9. Valve 68 consists of a flat nylon strip held in position by a pair of pins 72 and 73 which extend through slots in the nylon strip, as shown so that the nylon strip is free to flex and move by a small amount to uncover the inlet opening and permit the entrance of fluid. Preferably, the nylon strip is prestressed—that is, the nylon strip would tend to assume a straight flat position except that it is held in a curved position over the inlet port by pins 72 and 73. The nylon valve is fast-acting, relatively silent in operation, and resists wear much better than metal valves. The other valves may be similar in construction to valve 68, except that the outlet valves are reversed in position, as shown in Fig. 8, to permit fluid to pass outward but not inward through the outlet connections 64 and 65.

Referring again to Fig. 7, two circuit constrictions could be used in place of constriction 46, one constriction being placed in each of the output connections 64 and 65. The pump could then be simplified by omitting output valves 69 and 70, with only a moderate loss in pumping efficiency. For example, consider that output valve 70 has been replaced by a circuit resistance such as a constriction similar to 46. When diaphragm 59 moves upward, inlet valve 68 is closed and fluid is forced out through the constriction. When diaphragm 59 moves downward, inlet valve 68 opens, and only a small amount of fluid flows backward into the pump through the constriction since the passageway through the inlet valve has a much lower circuit resistance. As another alternative, instead of placing a constriction in series with the outlet valves 69 and 70, a constriction or constrictions can be placed in series with the inlet valves 68 and 71. If a constriction is placed in series with each inlet valve, the inlet valves may be omitted, provided the outlet valves are retained. With this pump, at least one valve having unidirectional characteristics is required in each pump section to establish a direction of net fluid flow.

Fig. 10 shows an arrangement whereby the pump shown in Figs. 8 and 9 can be connected as a single-acting pump. The outlet connection 64 of the first pump section is connected by a direct hydraulic circuit to the inlet connection 63 of the second pump section, so that a single-action pump is obtained which has an inlet connection 62 and an outlet connection 65. Being a single-action pump, this modification expels liquid during only one-half of each cycle, but it has the unusual property that it receives liquid during the same half-cycle, rather than during alternate half-cycles, and thus always contains the same volume of fluid. This property makes the pump useful in some applications. When two of the pumps like that shown in Fig. 10 are used in the control system shown in Fig. 7 the two pumps should be operated in-phase rather than in phase opposition.

Fig. 11 shows another control system in which a pump 74 has two of the bender piezoelectric diaphragms, identified in the drawing by reference numerals 75 and 76 respectively, extending transversely across a cylindrical cavity in the pump housing and parallel to each other. Diaphragms 75 and 76 are preferably operated by voltages from the same A.C. supply 177, but they are connected so that the two diaphragms vibrate in phase opposition—that is, so that diaphragms 75 and 76 both move inward toward each other at the same time, and then move outward away from each other at the same time. Check valves 77 and 78 are so arranged that the direction of net fluid flow is from inlet opening 79 to the space or chamber on the right of diaphragm 76, through check valve 77 to the space or chamber between diaphragms 75 and 76, through check valve 78 to the space or chamber on the left of diaphragm 75, and thence to outlet opening 80. When the two diaphragms move toward each other, liquid is forced from the chamber between the diaphragms and through valve 78. Since diaphragms 75 is now moving to the right, substantially half of the liquid passing through valve 78 is absorbed in the increasing volume of the chamber to the left of diaphragm 75, while the remaining half is forced out through outlet 80. During the next half cycle, when diaphragms 75 and 76 are moving apart, check valve 78 is closed and liquid is forced out through outlet opening 80 by the decrease in volume of the chamber to the left of diaphragm 75. Consequently, the pump is, in effect, double-acting since liquid is expelled during both half cycles of operation.

In the Fig. 11 control system, pump 74 is operative with a substantially constant output pressure and the supply of fluid to a hydraulic motor or actuator 81 is regulated by a control or transfer amplifier valve 82 (schematically illustrated) of the supply-and-waste type. Liquid flows from outlet 80 of the pump through a constricted passageway 83 and an orifice 84 to the liquid return pipe 85. Liquid also flows from outlet 80 through a constricted passageway 86 and an orifice 87 to the return pipe 85. A bender piezoelectric assembly 88 is positioned between orifices 84 and 87 so that it acts as a differential flow controlling vane. The electrical terminals 89 and 90 of the piezoelectric vane 88 are supplied with a control direct voltage by any suitable means such as the potentiometer 91 and battery 92 connected as shown.

The hydraulic motor or actuator 81 has a vane 93 which is rotative with a shaft 94 within a substantially circular housing which is divided into two sections by a stationary partition 95. A pipe or fluid passageway 96 is connected from one side of the actuator housing to the outlet side of constricted passageway 83, as shown, and another pipe or fluid passageway 97 is connected from the other side of the actuator housing to the outlet side of the constricted passageway 86.

Assume that the movable tap of potentiometer 91 is placed at the center tap position 98. The voltage between terminals 89 and 90 is zero, and crystal 88 is in a neutral position substantially midway between orifices 84 and 87. Equal amounts of fluid now flow through the two orifices, and the pressure drops across constricted passageways 83 and 86 are equal. Consequently, equal hydraulic pressures are supplied through pipes 96 and 97 to the two sides of the actuator 81 housing, and vane 93 tends to remain stationary in whatever angular position it occupies. Now assume that the movable tap of potentiometer 91 is moved away from the center tap position 98. A voltage is applied between terminals 89 and 90, which causes bender piezoelectric assembly 88 to bend in one direction or the other, depending upon the voltage polarity. Assume that vane 88 bends toward orifice 84. This displacement of the piezoelectric vane increases the circuit resistance to fluid flow through orifice 84, and simultaneously decreases the circuit resistance to fluid flow through orifice 87. Consequently, less fluid flows through orifice 84 and the pressure drop across constricted passageway 83 decreases, while more fluid flows through orifice 87 and the pressure drop across constricted passageway 86 increases. Now a higher pressure is supplied to the actuator through pipe 96 than is supplied through pipe 97, and actuator vane 93 is rotated counterclockwise. As long as a control voltage is applied to crystal assembly 88 which causes it to bend toward orifice 84, vane 93 tends to continue rotating counterclockwise either until it reaches the mechanical limit of counterclockwise rotation or until rotation is stopped by some load applied to shaft 94. Conversely, when a control voltage of the opposite polarity is applied between terminals 89 and 90, vane 88 bends toward orifice 87, and vane 93 rotates clockwise. When there is no load upon shaft 94 tending to rotate the shaft, vane 93 can be stopped in any position by adjusting the control voltage to return piezoelectric vane 88 to the neutral or balance position midway between orifices 84 and 87. If there is a load which tends to rotate shaft 94, vane 93 can, in general, still be stopped by adjusting the control voltage so that vane 88 is in a slightly off-center position which provides a difference in the fluid pressures supplied by pipes 96 and 97 which exactly balances the rotative force of the load upon shaft 94. Thus the angular position of shaft 94 can be adjusted and controlled by moving the adjustable tap of potentiometer 91, or by any other means supplying an adjustable control voltage.

Since pump 74 operates continuously, several control valves similar to valve 82 can be operated from the same pump. Additional control valves may be connected to the system as indicated at 99. The hydraulic accumulator 100 is connected to the hydraulic circuit for the usual purposes.

Figure 12:
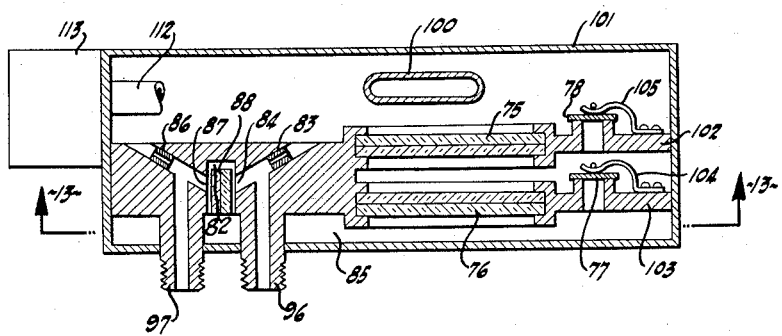
Fig. 12 is a section of a combined pump and three transfer valves forming a part of the control system shown in Fig. 11.
Figure 13:
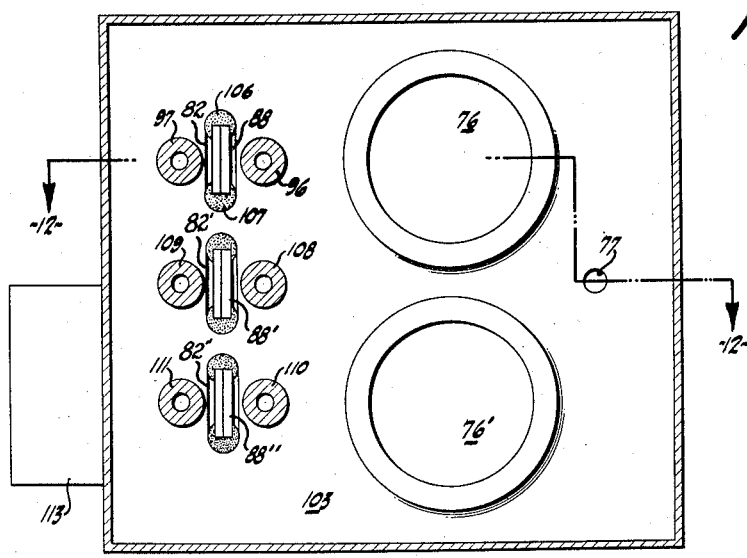
Fig. 13 is a section taken generally along the line 13—13 of Fig. 12.

Figs. 12 and 13 show a preferred construction of pump 74 and three control or transfer valves 82, 82′ and 82″, each functionally similar to valve 82 of Fig. 11, combined in a unified assembly within a common housing 101. The space within the right-hand side of housing 101 is divided into three parts or chambers by two parallel horizontal partitions 102 and 103, having apertures and supporting means to receive bender piezoelectric diaphragms 75 and 76, as shown. Partitions 103 and 102 have other apertures covered by check valves 77 and 78 arranged to permit fluid flow in one direction only from one to another of the chambers separated by the partitions. For rapid operation, valves 77 and 78 are small light discs of metal or nylon or other suitable material, held in place against the valve seats by prestressed springs 104 and 105. The accumulator 100, located within the upper chamber of housing 101, may be a length of resilient tubing having its interior connected to the atmosphere and constructed so that its volume contracts responsive to pressure of the fluid in the upper chamber.

Three transfer valves occupy the space within the left-hand side of housing 101, as shown. The bender piezoelectric vane 88 may be disc-shaped, but preferably it is rectangular and is supported at each end by small rubber pads 106 and 107, or other suitable means, so that the piezoelectric assembly can bend easily to deflect its center portion to either side. To provide the desired bending action, the control vane 88 is made of two piezoelectric plates having abutting faces cemented or otherwise fixed together, and being arranged so that the plates respectively expand and contract responsive to an applied voltage. The plates may be made from piezoelectric crystals or piezoelectric ceramics, but ceramic materials such as barium titanate are generally preferable.

Orifices 84 and 87 preferably are adjacent to the center of the control vane, and are at the ends of respective fluid passageways which communicate with opposite sides of a recess containing control vane 88, as shown in Fig. 12. Constricted passageways 83 and 86 are formed by two small plugs having capillary axial bores. Output connections 96 and 97 are threaded to receive conventional fluid couplings for hydraulic tubing or pipes leading to a hydraulic motor or actuator. Two other control valves, identical to control valve 82, and side-by-side therewith, comprise bender piezoelectric control vanes 106 and 107 and output connections 108, 109, 110, and 111, as shown in Fig. 13. Electrical connections to the piezoelectric pump diaphragms and to the piezoelectric control vanes are made through a cable 112 and an electrical connection box 113.

To provide additional pumping capacity, two sets of pump diaphragms may be provided which are hydraulically connected in parallel. For example, as shown in Fig. 13, partition 103 has two apertures respectively receiving piezoelectric diaphragms 76 and 76′, which are electrically connected in parallel and operate synchronously to produce the same effect as a single diaphragm of larger size. In a similar manner, two or more piezoelectric pump diaphragms may be located side by side in partition 102. Since the hydraulically parallel pump diaphragms operate synchronously, only one set of check valves 77 and 78 is required.

Figure 14:
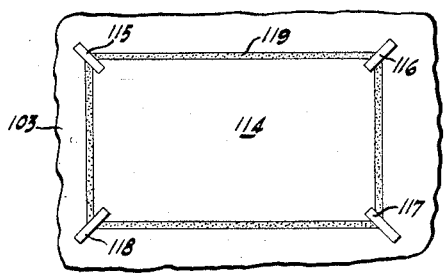
Fig. 14 is a fragmentary plan view showing a modification of the piezoelectric diaphragm.

For reasons hereinbefore explained, disc-shaped piezoelectric pump diaphragms are preferred. However, diaphragms of other shapes may be used. For example, instead of using two disc-shaped diaphragms 76 and 76′ as shown in Fig. 13, an elongated rectangular bender piezoelectric diaphragm 114 may be used as shown in Fig. 14. Since bending of the rectangular diaphragm 114 results in some warping of its edges away from a flat plane, the mounting means and liquid seal around the periphery of the diaphragm 114 cannot be as rigid as is possible in the case of disc-shaped diaphragms. Accordingly a semi-flexible mounting means for diaphragm 114 is provided, which may consist of fingers 115, 116, 117 and 118 which hold the corners of the diaphragm 114 in place sufficiently for the bending action of the diaphragm to produce a pumping action. To prevent the leakage of liquid around the edges of the diaphragm, a resilient sealing means is employed, such as a thin rubber gasket 119.

Referring now to Fig. 15, a control system is shown comprising a pump 120, a control or transfer amplifier valve 121 and a hydraulic motor or actuator 122. Pump 120 has two disc-shaped bender piezoelectric diaphragms 123 and 124 positioned parallel to each other across a cylindrical cavity of the pump housing and arranged in a pump structure such that piezoelectric assemblies 123 and 124 not only act as pump diaphragms, but also act as the pump valving mechanism. These diaphragms are preferably made from two discs of piezoelectric ceramic material fixed together with suitable electrodes in the manner hereinbefore described. Each of the diaphragms 123 and 124 has a central axial aperture defining a fluid passageway through which fluid flows from one to the other of the three spaces or chambers within the pump housing which are separated by the two diaphragms. For precise dimensioning of these apertures, small hollow cylindrical liners 124' and 125, made of metal or other easily machined material, may be cemented in place within the apertures of the piezoelectric assembly. A cylindrical mandrel 126, which may be affixed to the left hand end of the pump housing, as shown, is alined with the aperture in crystal diaphragm 123, and preferably extends within hollow aperture liner 124' a distance in the order of a few thousandths of an inch. A small clearance is provided between liner 124' and mandrel 126 so that crystal diaphragm 123 can vibrate freely and so that a restricted flow of fluid between the aperture liner and the mandrel can occur. A mandrel 127 affixed to the right hand end of the pump housing is alined with the aperture in crystal diaphragm 124 and is similarly fitted to aperture liner 125. An alternating current supply 128 and a phase-splitting network 129, or any other means for supplying suitable alternating voltages in phase quadrature, supply operating voltages to the electrical terminals of piezoelectric diaphragms 123 and 124 so that the two diaphragms vibrate in phase quadrature. As a result liquid is pumped from input connection 128 to output connection 129 in a manner which will now be explained.

Because of the close fit between aperture liner 124' and mandrel 126, there is a substantial resistance to the flow of liquid through the aperture of diaphragm 123. As the diaphragm vibrates, this resistance to fluid flow decreases as the diaphragm moves inward to the right and the length of the restriction is decreased. Conversely, the resistance to fluid flow through the aperture of diaphragm 123 increases as the diaphragm moves outward to the left and the length of the restriction between liner 124' and mandrel 126 is increased. If desired, either the mandrel or the liner or both can be tapered to accentuate this resistance variation. A similar variation in resistance to the flow of fluid through the aperture of diaphragm 124 occurs as this diaphragm vibrates—that is, the resistance decreases as diaphragm 124 moves inward to the left and increases as diaphragm 124 moves outward to the right.

Figure 16:
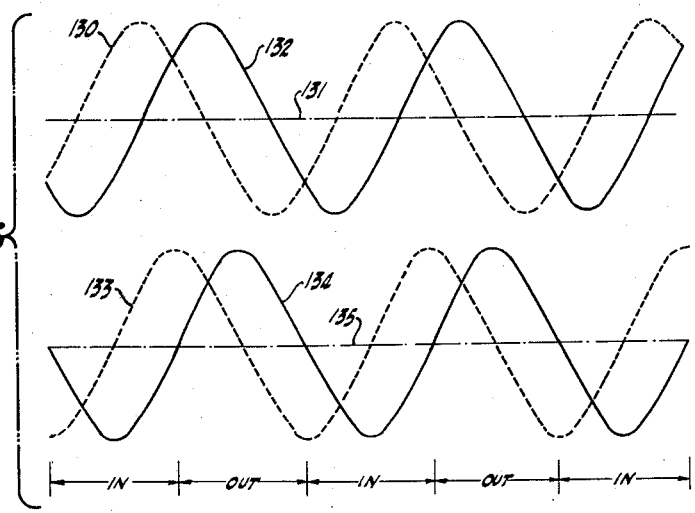
Fig. 16 is a group of curves useful in explaining the operation of the pump shown in Fig. 15.

Referring now to Fig. 16, the broken-line sine wave curve 130 represents outward movement of diaphragm 123—that is, the positive peaks of sine wave curve 130 represents the points of maximum displacement of diaphragm 123 outward to the left and the negative peaks of sine wave curve 130 represent the maximum displacement of diaphragm 123 inward to the right. At points where curve 130 crosses the center line 131, diaphragm 123 is in its central undeflected position. The solid-line sine wave curve 132 represents outward deflection of diaphragm 123—that is, the positive peaks of curve 132 represent maximum deflection outward to the right of crystal diaphragm 124 and the negative peaks of curve 132 represent maximum deflection inward to the left of crystal diaphragm 124. Assuming that the hydraulic circuit resistance to fluid flow through the central aperture of a diaphragm varies linearly with outward displacement of the diaphragm, curves 130 and 132 also represent relative changes in the resistance to fluid flow through the aperture of diaphragm 123 and the aperture of diaphragm 124, respectively. In practice, the resistance variations are not in general strictly linear with displacement, but are somewhat nonlinear in a manner and to a degree that depends upon the dimensions and design of the aperture and the mandrel, but this does not substantially affect the principles involved in the operation of the pump, and an assumption that the resistance to displacement relationship is linear is sufficiently valid for the present discussion.

Still referring to Fig. 16, it will be noted that curves 130 and 132 are in phase quadrature, since the two piezoelectric diaphragms are driven by quadrature-phased voltages. Since curves 130 and 132 both represent outward displacements, changes in the volume of the space or chamber between the two diaphragms are proportional to the sum of changes in the amplitudes of curves 130 and 132. Consequently, these volume changes can be represented by broken-line sine wave curve 133 which in phase is half-way between curves 130 and 132. The positive peaks of curve 133 represent the maximum volume between diaphragms 123 and 124, and the negative peaks of curve 133 represent the minimum volume between the two diaphragms. The liquid flow rate out of the space between the two diaphragms is proportional to the rate of change of the volume between the diaphragms, and the outward flow rate is represented by the solid-line sine wave curve 134 which lags curve 133 by 90 degrees. The negative half-cycles of curve 134, lying below center line 135, represent fluid flow into the space between the two diaphragms and the positive half cycles of curve 134, above the center line 135, represent fluid flow out of the space between the two diaphragms, as is more clearly indicated by the "in" and "out" legends below curve 134 in the drawing.

It has been pointed out that curve 130 represents the relative resistance to fluid flow through the aperture in diaphragm 123, while curve 132 represents the relative resistance to fluid flow through the aperture in diaphragm 124. When fluid flows into or out of the space between the two diaphragms, a part of the fluid flow passes through each of the two apertures, but the larger amount of flow is through the aperture having the smaller hydraulic circuit resistance. Now, comparing curves 130, 132 and 134, it will be noted that curve 130 exceeds curve 132 during the entire half cycle when fluid is flowing into the volume between the two diaphragms: accordingly, more fluid flows inward through the aperture in diaphragm 124 than flows inward through the aperture in diaphragm 123. Conversely, curve 132 exceeds curve 130 during the entire half-cycle when fluid is flowing out of the space between the two diaphragms: accordingly, more fluid flows outward through the aperture in diaphragm 123 than flows outward through the aperture in diaphragm 124. Thus the net fluid flow has a unidirectional component which passes through inlet connection 128, through the aperture in diaphragm 124 to the space between the two diaphragms, then through the aperture in diaphragm 123 to outlet connection 129. Because some fluid flows in the reverse direction, the amount of liquid pumped during each cycle is less than the change in volume between the two diaphragms, but this loss is compensated by the fact that pump 120 can be operated at much higher cyclic rates than is possible with a pump having mechanical check valves. Furthermore, the elimination of valve wear and maintenance is a distinct advantage.

In Fig. 15, the two mandrels 126 and 127 are shown on the outer sides of the diaphragm outside the chamber between the diaphragms, so that the hydraulic circuit resistance of the apertures increases as the diaphragms move outward. Alternatively, the mandrels may be placed on the inner sides of the diaphragms, within the chamber between the diaphragms, so that the hydraulic circuit resistance increases as the diaphragms move inward. But in this latter case, the direction of fluid flow through the pump will be reversed unless the phase sequence of the operating voltages, and hence the phase sequence of the diaphragm vibrations, is also reversed. In either case, the direction of flow through the pump can be reversed at will by reversing the phase sequence of the supply voltages. With the arrangement shown in Fig. 15, fluid flows from inlet 128 to outlet 129 when the outward vibration of diaphragm 124 lags the outward vibration of diaphragm 123.

If the electrical connections to either piezoelectric diaphragm were reversed, leaving the connections to the other piezoelectric diaphragm unchanged, the outward vibrations of diaphragm 124 would lead the outward vibrations of diaphragm 123, and fluid would be pumped from connection 129 to connection 128. In many applications, this characteristic whereby the pumping direction can be reversed electrically is extremely advantageous, as will be pointed out hereinafter.

Referring again to Fig. 15, pump 120 circulates liquid from inlet opening 128 to outlet opening 129 and thus creates a hydraulic pressure difference between these two openings. From the pump outlet, fluid flows through a constricted passageway 136 and an orifice 137 of transfer valve 121 to return pipe 138 and pump inlet connection 128. Fluid also flows from pump outlet 129 through a constricted passageway 139 and an orifice 140 of transfer valve 121 to return pipe 128. Transfer valve 121 includes a bender piezoelectric vane 141 positioned between orifice 137 and orifice 140 to control the relative flow rates through the two orifices and thus to control a difference in hydraulic pressures supplied through fluid passageways 142 and 143 to a hydraulic motor or actuator 122 having a rotative drum and vane 144 connected to a rotative shaft 145. The hydraulic system preferably includes a conventional accumulator 146.

Deflection of piezoelectric control vane 141 is controlled by a servo system which supplies to electric terminals 146 and 147 of the bender piezoelectric vane voltages of proper phase and polarity to adjust and control the angular position of shaft 145 in a desired manner. The simplified servo system illustrated in Fig. 15 consists of a first potentiometer 148 and a second potentiometer 149 connected in parallel across a suitable voltage source such as battery 150. Potentiometer 148 has an adjustable tap 151 connected mechanically or otherwise to rotate with shaft 145, so that changes in the angular position of shaft 145 change the position of adjustable tap 151 on potentiometer 148. Potentiometer 149 has an adjustable tap 152 which is positioned by any suitable means, not shown, in accordance with input data to the servo system. For example, adjustable tap 152 can be positioned manually in accordance with desired angular positions of shaft 145, and the mechanism illustrated will act automatically to adjust the position of shaft 145 so that it corresponds to the desired position set up by the manual adjustment of tap 152. When taps 151 and 152 are in corresponding positions on the two potentiometers, the voltage between the two taps is zero and zero control voltage is supplied to terminals 146 and 147. Consequently, control vane 141 is in its neutral position substantially midway between orifices 137 and 140, equal hydraulic pressures are supplied through fluid passageways 142 and 143 to opposite sides of actuator 122, and vane 144 remains stationary.

Now assume that the position of tap 152 is changed manually. A voltage exists between taps 151 and 152 which is amplified by a conventional D.C. amplifier 153 and supplied to the electrical terminals 146 and 147 of the piezoelectric vane 141. Responsive to this voltage, vane 141 bends to the right or to the left, depending upon the polarity of the applied voltage, and thus changes the relative hydraulic circuit resistances through orifices 137 and 140 to provide a difference in the hydraulic pressures supplied to opposite sides of actuator 122. This moves vane 144, rotates shaft 145, and readjusts the position of tap 151. When the shaft 145 has reached the desired angular position, the position of tap 151 again corresponds to the position of tap 152 and control vane 141 returns to its neutral position, whereupon motion of actuator vane 144 stops.

Figure 17:
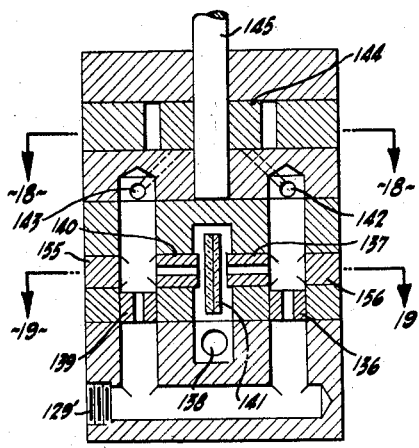
Fig. 17 is a section showing a combined control valve and actuator forming a part of the control system shown in Fig. 15.
Figure 18:
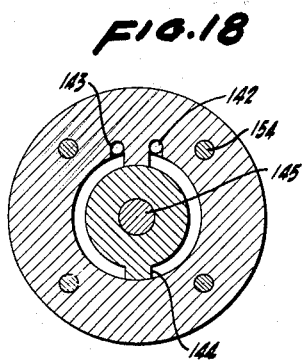
Fig. 18 is a section taken generally along the line 18—18 of Fig. 17.
Figure 19:
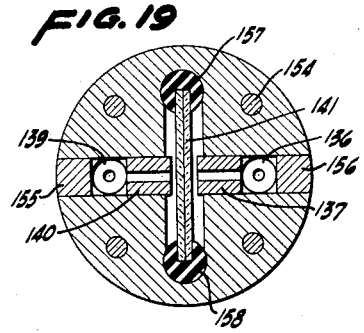
Fig. 19 is a section taken generally along the line 19—19 of Fig. 17.

A preferred construction of transfer valve 121 and actuator 122 is shown in Figs. 17, 18 and 19. Referring now to these figures, the valve and actuator housing is an assembly of substantially disc-shaped members stacked end to end and held together by suitable means such as screws 154. The entire assembly may be about one inch in diameter, for example. The bottom member of the assembly has a fluid passageway 129' threaded at its outer end for connection through piping or other suitable means to outlet connection 129 of pump 120. Extending upward from passageway 129' are two fluid passageways respectively containing plugs with capillary bores, as shown, forming constricted passageways 136 and 139. Inwardly extending passageways contain plugs having capillary bores forming orifices 137 and 140. For manufacturing convenience and to provide access for cleaning the orifices, these inwardly extending passageways also extend outward through the wall of the housing, and are closed by removable plugs 155 and 156. The vertical passageways containing constrictions 136 and 139 extend upward to join passageways 142 and 143 which transmit the hydraulic pressures to actuator 122. Piezoelectric control vane 141 is contained in a central recess which communicates with return pipe 138, and into which orifices 137 and 140 extend from opposite sides. The control vane 141 is supported at its two ends by suitable means such as small rubber pads 157 and 158, as shown, so that the center of the control vane is adjacent to the orifices and can deflect readily in either direction. The control vane can be either disc-shaped or rectangular, and preferably is made from two plates of piezoelectric ceramic material fixed together as a piezoelectric bender assembly.

Figure 20:
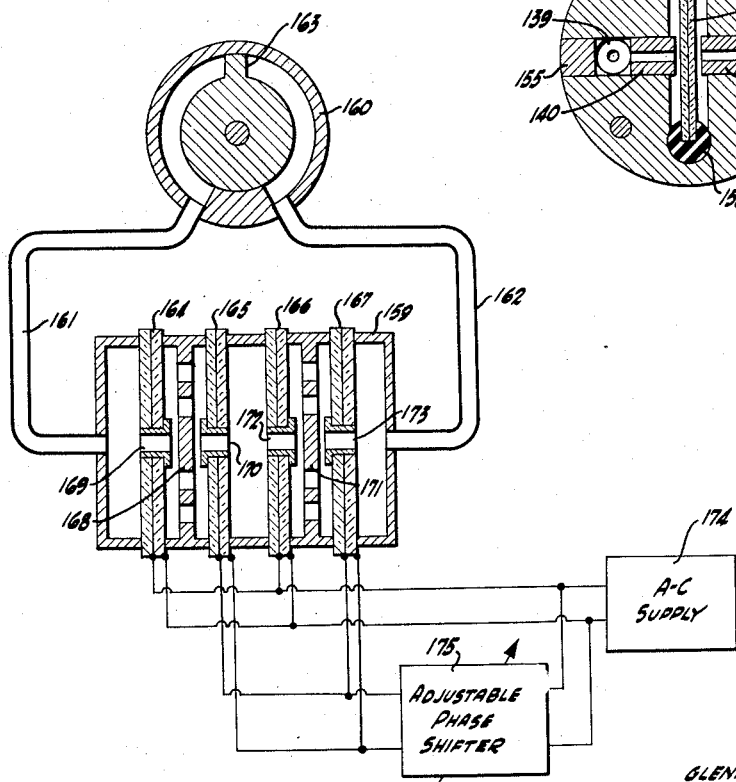
Fig. 20 is a schematic diagram of still another control system embodying certain principles of this invention.

Fig. 20 shows a control system comprising a variable output reversible pump 159 and a hydraulic motor or actuator 160. One input-output connection of the pump is connected through a pipe or fluid passageway 161 to one side of actuator 160, and the other input-output connection of the pump is connected by a pipe or fluid passageway 162 to the other side of actuator 160, so that when the pump is operated to pump fluid in one direction vane 163 of the actuator moves in one direction, and when the pump is reversed actuator vane 163 moves in the opposite direction.

Pump 159 has the same general principles of operation as the pump 120 described in connection with Fig. 15, but pump 159 is a three-stage pump capable of delivering a correspondingly higher output pressure, and is electrically controlled in a somewhat different manner. In pump 159, there are four disc-shaped bender piezoelectric diaphragms of the type hereinbefore described, identified in the drawing by reference numerals 164, 165, 166 and 167, extending parallel to one another and transversely across a cylindrical cavity within a pump housing. The four diaphragms have alined central apertures, as shown. The three spaces or chambers within the pump housing between the four diaphragms constitute three pump stages, each of which increases the hydraulic pressure by approximately one-third of the total pressure increase. Between the piezoelectric diaphragms 164 and 165 there is a stationary perforated metal diaphragm 168 having a solid center portion alined with the central apertures of crystal diaphragms 164 and 165. Hollow aperture liners 169 and 170 may be provided with flanges as shown on their ends adjacent to stationary diaphragm 168, so that a restricted passageway is provided between each of the aperture liners 169 and 170 and the solid central portion of diaphragm 168. Since these restricted passageways change in thickness as the diaphragms 164 and 165 vibrate, the fluid resistance through the apertures varies with diaphragm displacement in a manner analogous to the resistance variations provided by the mandrel-and-aperture construction used in pump 120 of Fig. 15. Another stationary perforated diaphragm 171 is provided between piezoelectric diaphragms 166 and 167, and the apertures of these diaphragms have liners 172 and 173 cooperating with diaphragm 171 in the same manner as liners 169 and 170 cooperate with diaphragm 168.

With respect to the center pumping stage, comprising the space or chamber between diaphragms 165 and 166, the resistance through each aperture in diaphragms 165 and 166 is greatest when the diaphragm is at its position of maximum displacement outward from the center chamber, so that this pumping stage operates in substantially the same manner as the pump 120 shown in Fig. 15. In the two other outer pumping stages, comprising the space or chamber between diaphragms 164 and 165 and the space or chamber between diaphragms 166 and 167, the maximum resistance to fluid flow through a diaphragm aperture occurs at the point of maximum diaphragm displacement inward toward the pumping chamber, so that these stages correspond to pumps like the modified form of pump 120 having the flow-obstructing mandrels placed inside the pumping chamber instead of outside the pumping chamber. So that the three stages of pump 159 will all pump in the same direction, it is necessary that the diaphragms of the center pumping stage vibrate in opposite phase sequence to the diaphragms of the two outer pumping stages. This is accomplished simply by connecting piezoelectric diaphragms 164 and 166 electrically in parallel, so that these two diaphragms always move in the same direction at the same time, and by connecting diaphragms 165 and 167 in parallel so that these two diaphragms always move in the same direction at the same time. For maximum pumping action, these two sets of parallel-connected piezoelectric diaphragms should be driven in phase quadrature, but for control purposes other phase relations are sometimes used, as will now be described.

Piezoelectric diaphragms 164 and 166 are connected directly to an alternating current supply 174. Piezoelectric diaphragms 165 and 167 are connected to alternating current supply 174 through an adjustable phase shifter 175, which preferably can be adjusted to provide any desired phase shift between +90° and —90°. Numerous phase-shifting circuit networks and other phase-shifting devices having suitable characteristics are well known in the art. When phase shifter 175 is adjusted for zero phase shift, all of the piezoelectric pump diaphragms vibrate in the same direction at the same time, and under these conditions there is no unidirectional fluid flow through the pump and consequently there is no hydraulic pressure difference between pipes 161 and 162 to operate actuator 169. When the phase shifter 175 is adjusted to produce a phase shift in one direction, the positive or leading phase direction for example, the resulting phase differences in the diaphragm vibrations cause the cyclic hydraulic resistance variations at the diaphragm apertures to produce a rectifying effect on the fluid flow; and a unidirectional net fluid flow or pressure difference, or both, occurs which becomes a maximum when the phase shift is 90°. When phase shifter 175 is adjusted to produce a phase shift in the opposite direction, the negative or lagging phase direction for example, a unidirectional fluid flow or pressure difference, or both, is established in the other direction, which also becomes maximum when the phase shift is 90°. Thus, by adjusting the phase shift produced by phase shifter 175 over a range of +90° to —90° phase shift, the output of pump 159 is changed from maximum flow or pressure in one direction through zero flow and pressure to maximum flow or pressure in the other direction, and there is provided extremely good control over the motion and positioning of actuator vane 163. In other words, considering the voltage supplied to one set of piezoelectric pump diaphragms as a phase reference, the hydraulic output of the pump is substantially proportional to the quadrature component of the voltage supplied to the other set of pump diaphragms.

In place of the phase shifter 175, piezoelectric diaphragms 165 and 167 may be driven by other voltages having the same frequency as that supplied by A.C. supply 174, and having a phase which changes in accordance with a desired control function. Alternatively, the voltage supplied to the two diaphragms 165 and 167 may always be in phase quadrature to the voltage supplied by A.C. supply 174, but may vary in amplitude in accordance with the desired control function and may reverse in phase to represent negative amplitude. Voltages having such phase and amplitude relations are found in many control systems. Pump 159 converts such electrical signals directly into hydraulic signals, and thereby eliminates the electric motor or electronic phase comparator devices which have heretofore generally been required.

The novel hydraulic control systems which have been described are especially well adapted for use with small instrument-type servo mechanisms such as are employed, for example, to adjust the orientation of the detector element in magnetic detection equipment. The high cyclic rate of operation which is possible with the piezoelectric diaphragm pump makes a very fast response speed feasible, and this fast response may be further enhanced, if desired, by use of the piezoelectric vane transfer valve. No part of the system produces any appreciable magnetic field which would interfere with magnetic measurements. The crystal assemblies are preferably operated at relatively high voltages, in the order of several hundred volts, and at very low currents. Furthermore, these currents pass through only a single-turn loop formed by the two leads to the crystal, and even the small magnetic effect of this single turn loop can be substantially cancelled out by twisting the leads together. Although the absence of magnetic field effects makes the control systems described especially useful with magnetic detection equipment, it will be appreciated that these hydraulic control systems have a much wider range of usefulness, and that the inventive principles herein disclosed may be used and applied in many different ways. Accordingly, it should be understood that the invention is not limited to specific applications and embodiments herein illustrated and described, and it is intended that the following claims should cover all changes and modifications which do not depart from the true spirit and scope of the invention.

What is claimed is:

1. A transfer valve comprising a pair of opposed fluid discharge orifices, a bender element of a material that deforms elastically under electric stress, said element being positioned between said orifices and restricting the discharge of fluid therefrom, and means supplying a voltage across said element to bend said element toward one or the other of said orifices selectively, whereby said voltage controls the relative fluid discharge rates of said two orifices.

2. A transfer valve of the supply-and-waste type for providing an electrically controlled variable pressure, comprising a pressure transmitting passageway for containing fluid under variable pressure, a fluid supply passageway for conveying fluid to said pressure transmitting passageway, said fluid supply passageway containing a flow restricting constriction providing a variable pressure drop depending upon the rate of fluid flow therethrough, a fluid waste orifice for conveying fluid from said pressure transmitting passageway, a vane of a material that deforms elastically under electric stress, said vane being positioned adjacent to said orifice for controlling the rate of fluid flow therethrough, and electrical connections for supplying a voltage to said vane, said vane bending and moving relative to said orifice responsive to said voltage so that the rate of fluid flow through said orifice is a function of said voltage, whereby said voltage controls the pressure in said pressure transmitting passageway.

3. A transfer valve of the supply-and-waste type for providing an electrically controlled variable differential pressure, comprising first and second pressure transmitting passageways each adapted to contain fluid under variable pressure, fluid supply means, a first constricted passageway for conveying fluid from said fluid supply means to said first pressure transmitting passageway and providing a variable pressure drop depending upon the rate of fluid flow therethrough, a second constricted passageway for conveying fluid from said fluid supply means to said second pressure transmitting passageway and providing a variable pressure drop depending upon the rate of fluid flow therethrough, a first fluid waste orifice for conveying fluid from said first pressure transmitting passageway, a second fluid waste orifice for conveying fluid from said second pressure transmitting passageway, a bender element of a material that deforms elastically under electric stress, said element being positioned adjacent to and between said two orifices for restricting the rate of fluid flow therethrough, connections for supplying voltage to said element, said element bending and moving toward one of said orifices and away from the other of said orifices responsive to said voltage so that the ratio of the fluid flow rates through said two orifices is a function of said voltage, whereby said voltage controls the differential pressure between said two pressure transmitting passageways.

4. A transfer valve comprising a pressure transmitting passageway for containing fluid under variable pressure, a constricted passageway for conveying fluid to said pressure transmitting passageway, an orifice for conveying fluid from said pressure transmitting passageway, a substantially flat rectangular vane that deforms elastically under electric stress, said vane having a central portion transverse to and adjacent to said orifice for restricting the flow of fluid therethrough, two resilient mounts respectively supporting opposite ends of said vane in substantially fixed position, connections for supplying a variable control voltage to said vane, said vane being a bender element consisting essentially of two parallel plates of a material that deforms elastically under electric stress, said plates being bonded together and changing in length differently responsive to said control voltage, whereby said vane bends and the central portion thereof moves relative to said orifice for varying the rate of fluid flow therethrough and said variable pressure varies as a function of said control voltage.

5. A transfer valve comprising a housing containing a central cavity, a substantially flat bender element of a material that deforms elastically under electric stress, said element being transversely disposed within said cavity, two resilient mounts respectively supporting opposite ends of said bender element in substantially fixed position within said cavity, two fluid passageways within said housing on opposite sides of said cavity, two fluid conveying capillaries connecting respective ones of said passageways to said cavity, said capillaries being axially alined with each other normal to the plane of said bender element, the cavity ends of said capillaries forming two fluid discharge orifices on opposite sides of said element adjacent to a central portion thereof, connections for conveying fluid from said cavity, fluid supply connections for supplying fluid under pressure to said passageways, each of said passageways containing a constricting plug between said supply connections and said capillaries for producing a pressure drop directly related to the rate of fluid flow therethrough, whereby the relative fluid pressures within said passageways depend upon the relative rates of fluid discharge through said orifices, and connections for supplying a control voltage to said bender element, said element bending and moving toward one of said orifices and away from the other of said orifices responsive to said voltage, whereby the ratio of fluid discharge rates through said two orifices is controlled by said voltage to provide a voltage controlled difference between the fluid pressures within said two passageways.

References Cited in the file of this patent

UNITED STATES PATENTS

| | | |
|---|---|---|
| Re. 18,531 | Kay | Nov. 9, 1929 |
| 1,743,005 | Resler | Jan. 7, 1930 |
| 2,195,417 | Mason | Apr. 2, 1940 |
| 2,208,940 | Dunning | July 23, 1940 |
| 2,270,313 | Kraft | Jan. 20, 1942 |
| 2,317,166 | Abrams | Apr. 20, 1943 |
| 2,387,108 | Arndt et al. | Oct. 16, 1945 |
| 2,398,421 | Frische et al. | Apr. 16, 1946 |
| 2,453,595 | Rosenthal | Nov. 9, 1948 |
| 2,475,304 | Bariffi | July 5, 1949 |
| 2,512,743 | Hansell | June 27, 1950 |
| 2,600,348 | Walthers | June 10, 1952 |
| 2,607,858 | Mason | Aug. 19, 1952 |
| 2,669,183 | Godbold | Feb. 16, 1954 |
| 2,700,374 | Jacobsen | Jan. 25, 1955 |
| 2,706,326 | Mason | Apr. 19, 1955 |
| 2,767,689 | Moog | Oct. 23, 1956 |

FOREIGN PATENTS

| | | |
|---|---|---|
| 276,755 | Switzerland | July 31, 1951 |

OTHER REFERENCES

Ser. No. 366,364, Wunsch et al. (A.P.C.), published Apr. 27, 1943.